(12) United States Patent
Forsyth (10) Patent No.: US 7,047,030 B2
(45) Date of Patent: May 16, 2006

(54) GROUP COMMUNICATION METHOD FOR A WIRELESS COMMUNICATION DEVICE

(75) Inventor: John Matthew Forsyth, London (GB)

(73) Assignee: Symbian Limited, London (GB)

( * ) Notice: Subject to any disclaimer, the term of this patent is extended or adjusted under 35 U.S.C. 154(b) by 358 days.

(21) Appl. No.: 10/476,261

(22) PCT Filed: May 2, 2002

(86) PCT No.: PCT/GB02/02046

§ 371 (c)(1),
(2), (4) Date: Oct. 28, 2003

(87) PCT Pub. No.: WO02/089408

PCT Pub. Date: Nov. 7, 2002

(65) Prior Publication Data

US 2004/0137882 A1   Jul. 15, 2004

(30) Foreign Application Priority Data

May 2, 2001   (GB)   .................................. 0110781.2

(51) Int. Cl.
*H04M 3/00* (2006.01)
(52) U.S. Cl. .................. 455/518; 455/519; 455/456; 455/416
(58) Field of Classification Search ................ 455/418, 455/419, 459, 557, 466, 458, 463, 416, 414.1; 379/205.01, 202.01, 93.21, 158; 370/260–262, 370/266
See application file for complete search history.

(56) References Cited

U.S. PATENT DOCUMENTS

| | | | | |
|---|---|---|---|---|
| 5,511,232 A | * | 4/1996 | O'Dea et al. ................ | 455/519 |
| 6,253,091 B1 | * | 6/2001 | Naddell et al. ............. | 455/519 |
| 6,304,648 B1 | * | 10/2001 | Chang .................... | 379/202.01 |
| 6,377,560 B1 | * | 4/2002 | Dailey ........................ | 370/329 |
| 6,442,250 B1 | * | 8/2002 | Troen-Krasnow et al. ........................ | 379/93.15 |
| 6,477,387 B1 | * | 11/2002 | Jackson et al. ............. | 455/519 |
| 6,584,324 B1 | * | 6/2003 | Vivekanandan ............. | 455/519 |
| 6,898,436 B1 | * | 5/2005 | Crockett et al. ............ | 455/518 |
| 6,970,535 B1 | * | 11/2005 | Gregory et al. .......... | 379/88.13 |
| 2002/0032735 A1 | | 3/2002 | Burnstein et al. ........... | 703/204 |
| 2005/0054361 A1 | * | 3/2005 | Turcanu et al. ............. | 455/518 |

FOREIGN PATENT DOCUMENTS

| | | |
|---|---|---|
| GB | 0210142.6 | 10/2002 |
| WO | WO 00/69140 | 11/2000 |
| WO | WO01/93609 A1 | 12/2001 |
| WO | WO 01/97544 A1 | 12/2001 |
| WO | WO 02/31624 A2 | 4/2002 |

* cited by examiner

*Primary Examiner*—Sonny Trinh
(74) *Attorney, Agent, or Firm*—Synnestvedt Lechner & Woodbridge LLP (57) ABSTRACT

A group communication method for a wireless information device, in which the method comprises the step of using an application independent object which defines or references members of a group in a way that enables communication to take place between two or more members of the group. The group object defines solely the identities of members of a group: as such, it is application (and hence also content) independent. This means that a group created in one application (e.g. a diary/agenda application could use that same group as the recipient list for an invitation to a meeting); a voice application could use that same group to allow a voice call to be conferenced across to all group members. Similarly, data specifically created for one group and in one application can be re-used in a different application and the data viewed appropriately for that different application.

19 Claims, 9 Drawing Sheets

| Capability: | Can you create a discussion between group members on your own device? (Important since it facilitates setting up a group discussion) | Push delivery? (Push is more convenient to mobile users) | Is it possible to retain a long term record of exchanges between group members? (An important attribute for many new kinds of services) | Can you deliver messages to all members of a group, or is it restricted to one to one? (Clearly critical to group based messaging) | Do all group members see the same, unitary message thread, or are there instead many separate individual messages? (A single, unitary message entity (e.g. a thread) makes message organisation and navigation far easier.) | If a recipient is off-line (e.g messaging app not open), are they alerted anyway? Potentially very important for mobile usesge because of the high proportion of time users may not be on-line (i.e. actively using their messaging application). |
|---|---|---|---|---|---|---|
| Web bulletin board | No | No | Yes | Yes | Yes | No |
| Chat/instant messaging | Yes | Yes | No | Yes | Awkward | No |
| Group e-mail | Yes | No | Awkward | Yes | No | No |
| SMS | Awkward | Yes | No | Awkward | No | Yes |
| Forums | Yes | Yes | Yes | Yes | Yes | Yes |

Table 1

Figure 1

| Capability: | Can you create a discussion between group members on your own device?<br><br>(Important since it facilitates setting up a group discussion) | Push delivery?<br><br>(Push is more convenient to mobile users) | Is it possible to retain a long term record of exchanges between group members?<br><br>(An important attribute for many new kinds of services) | Can you deliver messages to all members of a group, or is it restricted to one to one?<br><br>(Clearly critical to group based messaging) | Do all group members see the same, unitary message thread, or are there instead many separate individual messages?<br><br>(A single, unitary message entity (e.g. a thread) makes message organisation and navigation far easier.) | If a recipient is off-line (e.g messaging app not open), are they alerted anyway?<br><br>Potentially very important for mobile useage because of the high proportion of time users may not be on-line (i.e. actively using their messaging application). |
|---|---|---|---|---|---|---|
| Web bulletin board | No | No | Yes | Yes | Yes | No |
| Chat/instant messaging | Yes | Yes | No | Yes | Awkward | No |
| Group e-mail | Yes | No | Awkward | Yes | No | No |
| SMS | Awkward | Yes | No | Awkward | No | Yes |
| Forums | Yes | Yes | Yes | Yes | Yes | Yes |

Table 1

GROUP COMMUNICATION METHOD FOR A WIRELESS COMMUNICATION DEVICE

CROSS REFERENCE TO RELATED APPLICATIONS

This application claims the priority of PCT Application No. PCT/GB02/02046 filed on May 2, 2002, and British Application GB 0110781.2 filed on May 2, 2001, the contents of which are hereby incorporated by reference.

BACKGROUND OF THE INVENTION

1. Field of the Invention

This invention relates to a group communication method for a wireless information device. The term 'wireless information device' used in this patent specification should be expansively construed to cover any kind of device with two way wireless information capabilities and includes without limitation radio telephones, smart phones, communicators, personal computers, computers and application specific devices. It includes devices able to communicate in any manner over any kind of network, such as GSM or UMTS, CDMA and WCDMA mobile radio, Bluetooth, 802.11, IrDA etc.

2. Description of the Prior Art

The convergence of communications and computing is delivering a new generation of wireless information devices, often referred to as smart phones or communicators. The most capable of these devices utilise operating systems such as the Symbian OS™ operating system from Symbian Limited of the United Kingdom. Wireless information devices based on the Symbian OS platform, are 'smarter' than current generation GSM phones in being able to offer multiple, advanced, robust client based applications. For example, current designs of communicators based on the Symbian OS platform include all of the applications found on a fully featured PDA, such as a contacts manager, messaging application, word processor, spreadsheet, synchronisation etc.

Mobile telephones have traditionally been regarded as tools which enable one to one voice communication. Desktop telephones are also predominantly used also for one to one voice communication, although conferencing in several call recipients is possible. Conference calling is also possible with current generation GSM mobile telephones, but the process is slow and awkward. In particular, it requires one party (a 'chairperson') to initiate all calls, place people on hold whilst new participants are called and join all participants into the conference call. Further, only the chairperson has an overview of the status of the entire conference call, so that participants are often, at the end of a conference call, left wondering whether the call is still on-going and if so, who can still hear them. There is a proliferation of different text based messaging systems which allow members of a groups to communicate with one another. But each system has some weakness—and in particular, no single system fully and successfully accommodates the unique characteristics of communicating between groups of mobile users.

SUMMARY OF THE PRESENT INVENTION

In a first aspect there is provided a group communication method for a wireless information device that enables communications to be sent and received between several wireless information devices operated by end-uses that form a group of end-users, the group being a sub-set of the end-users for whom the device stores contact information; in which the method comprises the steps of:
(a) the end-user of the device defining the identities of end-user that form the group;
(b) a group object being constructed that defines or references members of the group in a way that enables communication to take place from the device and all other members of the group;
(c) the group object being used by a first application running on the device to enable communication from the device to be made automatically to all members of the group;
(d) the group object being used by a second application running on the device, unrelated to the first application, to enable communication from the device to be made automatically to all members of the group.

A 'group object' is therefore a collection of information that describes or references at least the minimum amount of information about 2 or more entities (usually individual, but possibly also different aspects of the same individual) required for activities to be engaged in between them, or content to be shared or exchanged. It can be actual contact information for each member of a group, or pointers to that contact information on a remote server. The present invention is founded on the insight of providing an object which defines solely the identities of members of a group: as such, it is application (and hence also content) independent. This means that a group created in one application (e.g. for text based instant messaging) can immediately be used in other applications (e.g. a diary/agenda application could use that same group as the recipient list for an invitation to a meeting); a voice application could use that same group to allow a voice call to be conferenced across to all group members. Similarly, data specifically created for one group and in one application can be re-used in a different application and the data viewed appropriately for that different application. No earlier system includes the concept of the content and application independent 'group' object. Prior art groups, in contrast, are all application specific.

An implementation of the present invention, called Forums™, is a new approach to group communication from Symbian Limited of London, United Kingdom; it is designed specifically to allow current and very popular internet type services (e.g. chat/instant messaging between groups) to be handle effectively between mobile devices and to enable a new generation of group based communication services. Forums runs on the object based operating system Symbian OS. In Forums, a new group object can be created when a user defines the recipients of a message, or (going beyond a simple messaging application) whenever the user defines the desired participants to be involved in group communication. Equally, group objects can be defined independently of any specific task or application.

Figure 1:
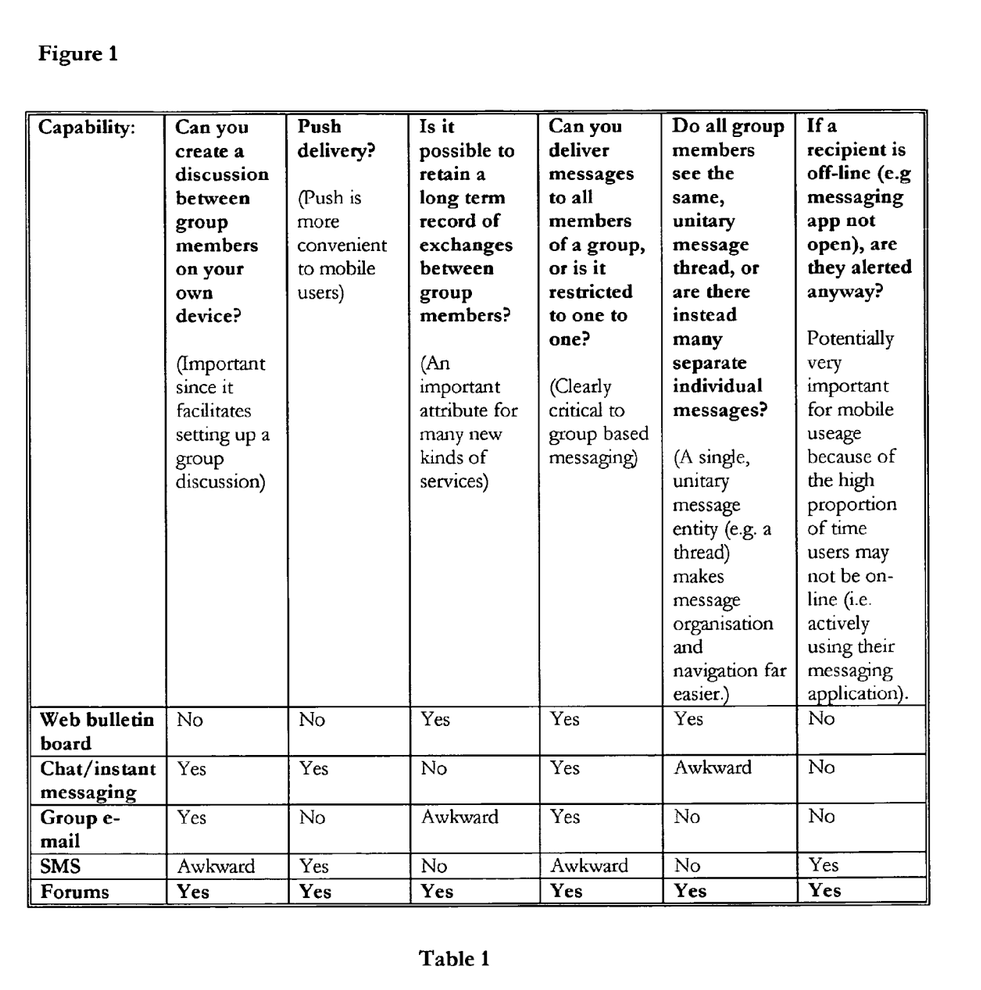
FIG. 1 is a table comparing the attributes of various prior art messaging schemes with an implementation of the present invention called Forums.

One can begin to appreciate Forums' strengths over conventional communications by mapping out some key features of Forums against conventional systems, as shown in Table 1. Table 1 establishes that Forums alone satisfies all of the key requirements for group based communication across wireless networks. This reflects Forum's ground-up design as a tool for group working and communication.

The concept of the 'group' has previously been of limited importance in telephony, other than for conference calling. But wireless information devices have the potential to greatly enhance the importance of the group. In part, that is because the mobility offered by wireless information devices makes it possible to reach all members of a group, no matter where they are or what they are doing. It follows that the virtual communities defined by a group may well become more important social units. Further, the advent of the internet and instant messaging has made it far easier for people to reach similar individuals than ever before; groups sharing common interests can form far more easily than before. Being able to make such groups persistent (i.e. group members can still be reached even if they are not sitting at their desks and working on their PCs) using wireless information devices again increases the importance of the group. Finally, because of the enormous volume of information available on the internet, it is becoming increasingly valuable to enable people to make sense of that information; groups have an important part to play since group members can provide recommendations and criticism. The content and application independent group object is therefore a foundation stone for building applications which enable a huge range of new group based communication/interaction functions.

Group objects may reside locally on client wireless information devices. Inaddition (or alternatively), thy may reside on a remote server which is designed to handle all aspects of storing and forwarding messages to the intended recipients, maintaining massage threads and making then readable to recipients etc. It is possible then to implement a group object in a distributed manner across a client server architecture, with an advanced client type wireless information device passing pointers (or other forms of identification which uniquely define a group or members of a group) to a central server which handles contacting each group member, storing messages, allowing message to be read, sending, receiving and distributing messages. The central server can also act as a store for resources which group-members may wish to discuss and share (e.g. personal information, personal photographs, music, web sites etc).

Other Key Features:

The group object can be used to initiate one or more of the following:
(a) group based e-mail
(b) group based text messaging
(c) group based telephone calls
(d) group based multi-player gaming
(e) group based multi-media messaging
(f) group based accessing of documents, music files or web sites Further, the same group object is capable of being used by any of the following applications irrespective of it being used by any other application:
(a) e-mailing application
(b) text based messaging application
(c) voice telephony
(d) multi-media messaging
(e) productivity applications (including word processing, spreadsheets, and presentation applications)
(f) gaming applications
(g) music playback
(h) video playback
(i) diary application
(j) address book application Communication can be over any bearer or protocol supported by the device.

Groups can be defined by a number of different parameters and are not necessarily limited to the kinds of groups currently known (e.g. groups of friends or work colleagues). For example, members of a group defined by a group object might share a common auto-generated physical or logical location—hence, a group might be generated which automatically takes as its members everyone at a particular concert venue (with location) sensing using conventional technology). Similarly, the group object could be related to a particular interest, such as being gaming related, with group members being those people with an interest in playing a particular kind of computer game. This would readily construct a multi-player gaming community, which could be organised according to various criteria (e.g. game types, skill levels, city/country location etc.).

The group object could also be used to share, amongst a pre-defined group, personal content such as photographs, opinions, music playlists, music tracks etc. Self-selected music tracks could even be streamed to group members (and beyond). Group objects can themselves also be exchanges/distributed (e.g. as a 'smart object').

A further aspect covers a wireless information device programmed to perform the above method.

In one implementation, the group object is used to define the addresses of multiple recipients for a message created on a wireless communication device. That message can subsequently be treated as a single 'communication object'. All linked (e.g. threaded) communications, such as replies and comments, then become part of the same communication object and, like any object are treated as a discrete entity. Hence, the entire communication object can be sent to a new person, or be archived etc. Discrete communication objects can arise whenever there are linked/related messages relating to communications between members of a group object on the same subject and can hence arise in any of the different applications which can use group objects. A diary event (e.g. lunch at 1 pm on Friday 18$^{th}$ January) can become a communication object and all messages relating to that event (and also other diary events) can all become part of the same communication objects.

In a final aspect related to messaging a message thread is stored only on the server (as in conventional web based groupware) but is also replicated on each client device. This approach is more effective for the wireless space, where connection is unreliable, and also means that instant messaging is greatly improved: without this locally stored thread, whenever the client device loses reception, then the entire thread would be lost, making IM very cumbersome. But with the thread being stored locally, the user is insulated from the usual wireless characteristics of dropped connections etc. and the IM thread appears robust and seamless. The server ensures that all replicated treads are kept up to date, giving the illusion that the discussion thread is a single object, even though it is in fact a proliferation of objects on separate clients. The server archive the distant history of a thread, for a client to access on request, in order that the memory constraints of the handheld devices can be respected.

BRIEF DESCRIPTION OF THE DRAWINGS

The present invention will be described with reference to the accompanying drawings, in which.

DETAILED DESCRIPTION

There is a proliferation of different text based messaging systems which allow members of a groups to communicate with one another. But each system has some weaknesses—and in particular, no single system fully and successfully accommodates the unique characteristics of communicating between groups of mobile users. Forums is a new approach to group-wide communications from Symbian Limited of London, United Kingdom; it is designed specifically to allow current and very popular internet type services (e.g. chat/instant messaging between groups) to be handled effectively between mobile devices and to enable a new generation of group based communication services.

Fundamental to Forums is the idea of there being an object which defines solely the identities of members of a group: as such, it is content and application independent. As noted above, this means that the same group object can be re-used across different applications, so that data and/or voice conferencing across a group is greatly simplified. Further, activities performed in different applications but which also involve the same group can re-use the same object. In this way, a user can organise people and entities (e.g. companies, clients etc.) into different group objects and can re-use that group object in many different applications (e.g. instant messaging, voice, e-mail etc).

Forums offers many advantages to group communication since it is an easy to understand messaging tool that facilitates open discussion amongst a group and allows multiple chat-style conversations to take place simultaneously. Forums also does not have any Forum management/membership issues: Forums is shared by all participants, so that any participant can invite someone new to the Forum. These advantages are best appreciated in the context of the following Scenario 1—group based text messaging:

1. Starting a Forum
2. Choosing Forum participants
3. The invite
4. Viewing Forums
5. Viewing messages in a Forum
6. Replying to a message
7. Inviting additional participants
8. Deleting Forums (unsubscribing)

1. Starting a Forum

Figure 2:
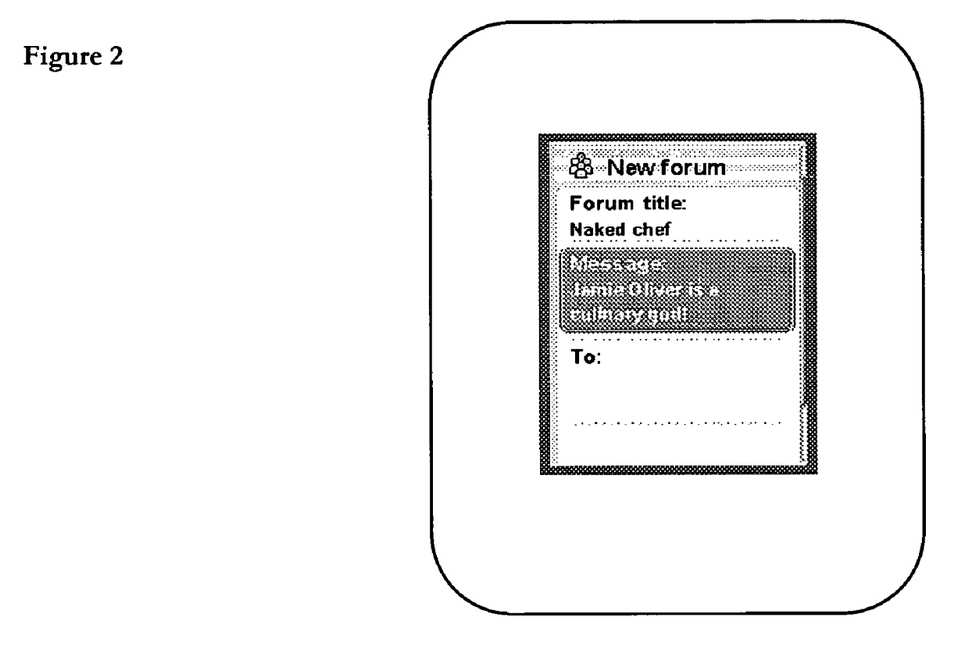
FIGS. 2–11 are screen shots of the display of a wireless information device running the Forums application.

To start a Forum, a user sends a short message to his chosen recipients. To do this, the user/Forum creator enters a SMS-style message and Forum title into the wireless communication device as shown in the FIG. 2 screen shot.

2. Choosing Forum Participants

Figure 3:
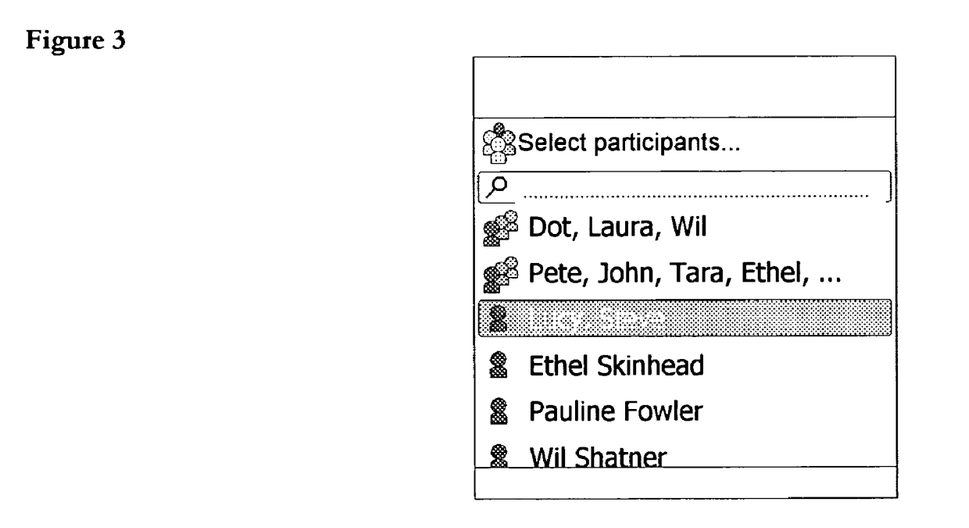
Figure 4:
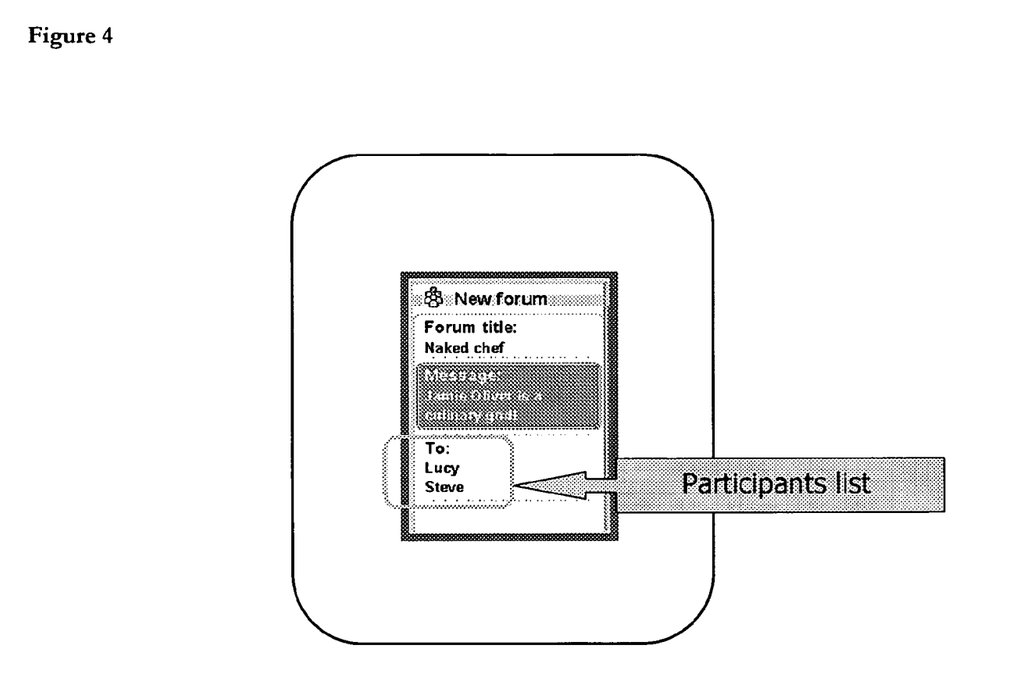

Once the tide and initial message have been entered, the Forum creator has to select whom he wishes to invite, as shown in FIG. 3. The creator selects each participant (or group of participants) one by one. Several pre-defined groups already exist; in the first group are Dot, Laura and Wil. In the second group are Lucy and Steve etc. Each group exists as an application independent object and can hence be accessed by different applications and used for a wide variety of purposes—whenever an application designer wishes to include some kind of group communication functionality. In this implementation, the most recent groups are remembered so that the user can reuse them in subsequent Forums. By doing this automatically, the user does not have to worry about creating groups. They can permanently save groups. The new Forum is shown in FIG. 4; this shows the title ("Naked Chef"), the message itself ("Jamie Oliver is a culinary god") and the group selected to receive the message (Lucy and Steve).

3. The Invite

Figure 5:
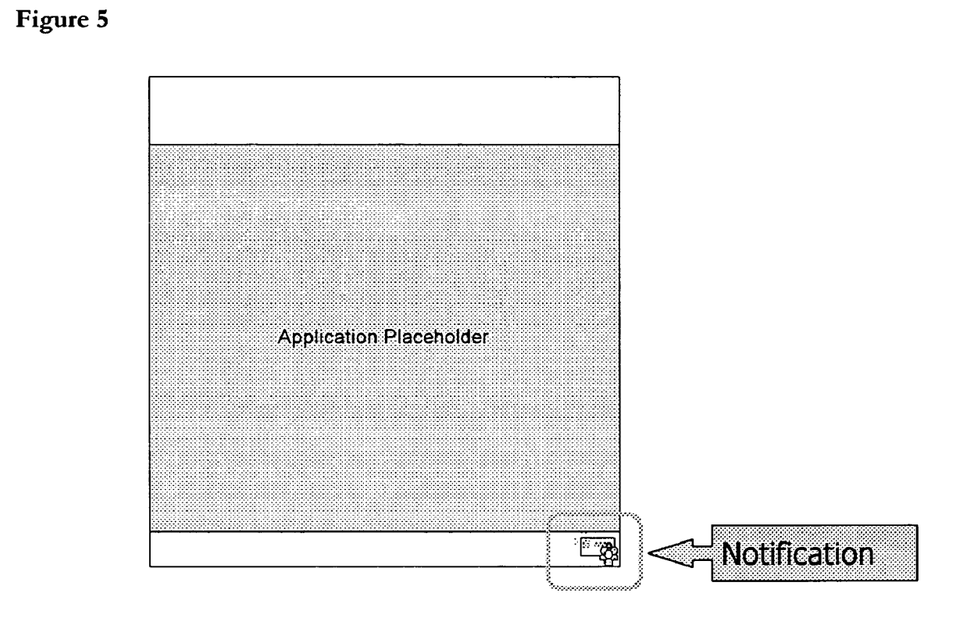

When the creator of the Forum finishes choosing participants, they are all notified, as shown in FIG. 5. The process is the following (assuming we do not have a completely peer-to-peer version):

the initial message is created;
an address list for that message is created;
these two are sent to the message server;
the message server stores these two objects and forwards a copy of the message to each of the people on the address list, along with an abstracted version of the address list, (abstracted so that all participants can see the nicknames of all other participants, but not necessarily see everything about their real world details).
Users can decide to decline to participate, in which case they are removed from the address list on the server via a message.
Assuming the user decides to participate, subsequent responses are of the form that the new message is sent to the server, which then forwards on the increment to all the people on the current (server-maintained) address list.

This happens automatically using network based resources (or within the client itself). Hence the experience is far more straightforward than current group communication systems.

4. Viewing Forums

Figure 6:
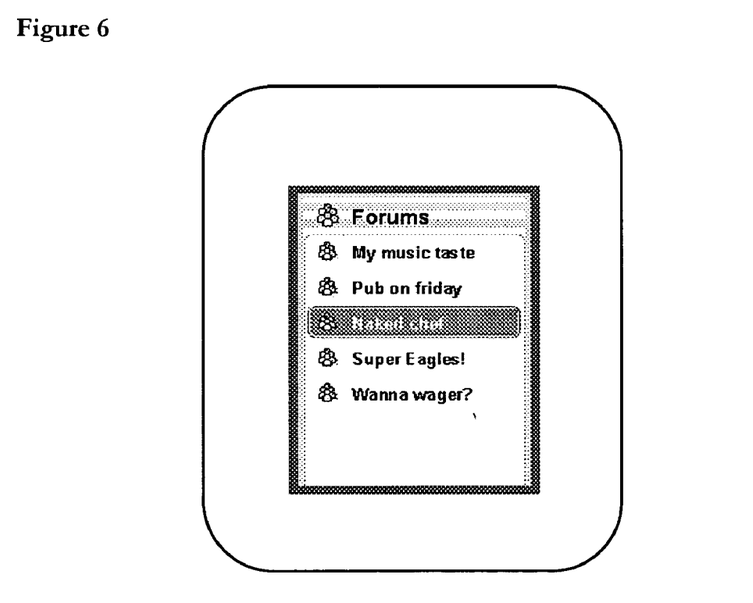

After a user receives notification of a Forum message, he can check the status of his Forums, as shown in FIG. 6. This view distinguishes Forums with unread (new) messages from those with read (old) ones. The new Forum (subject: Naked Chef is therefore shown highlighted, although colour may not be enough to act as the only distinguishing attribute. There may also be some graphical indication of the number of unread (new) messages.

5. Viewing Messages in a Forum

Figure 7:
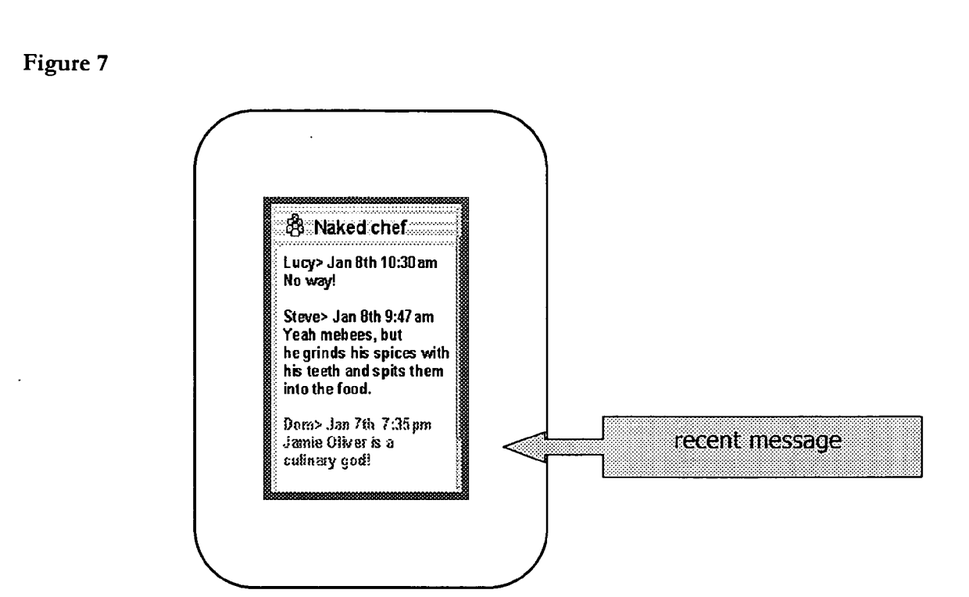
Figure 8:
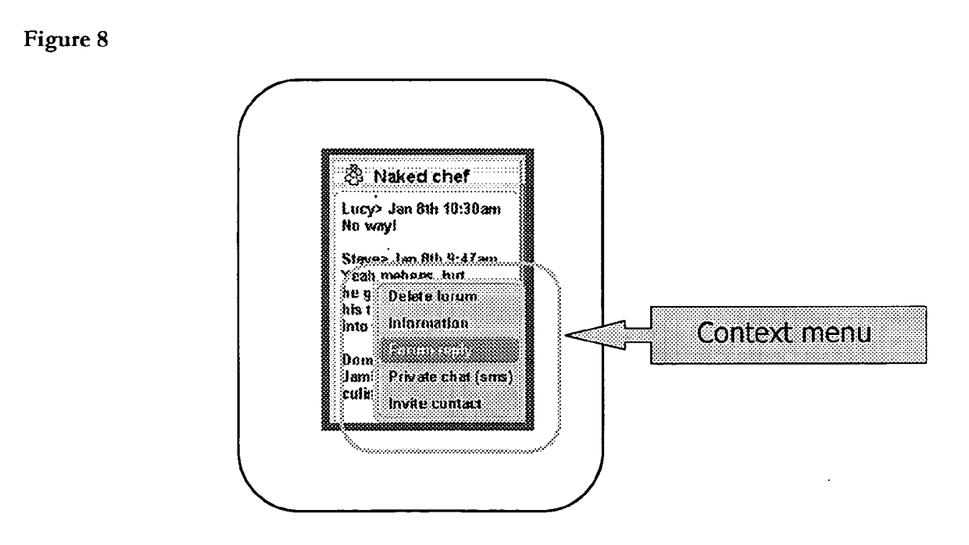

After clicking on a Forum title in the summary view, the user is shown the messages posted to that Forum, as shown in FIG. 7. New messages are easily identifiable. Messages appear in date order, i.e. newest messages appear at the bottom. The view automatically focuses on the most recent message to minimize scrolling. By entering this view, unread (new) messages are marked as read (old). The user can also make a context menu appear as shown in FIG. 8. This allows the user to carry out additional tasks related to the Forum, such as private chat (e.g. SMS or voice) or get more information about the Forum (e.g. a list of current participants). An indicator by each participant's name can be used to show who is and is not currently online. This might promote private conversations based on postings to the Forum.

6. Replying to a Message

Figure 9:
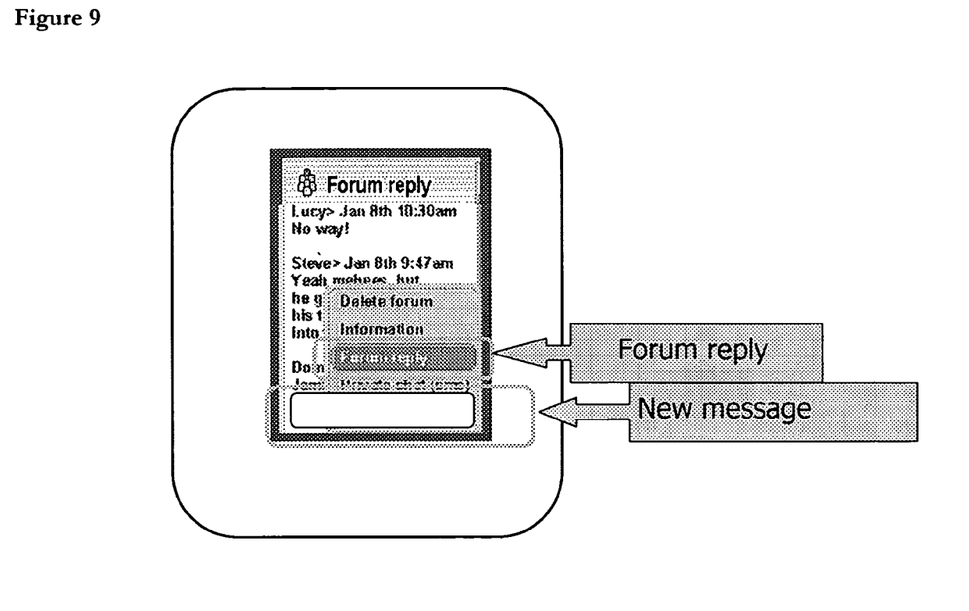

If a user clicks on 'Forum reply' then a new message is posted to the Forum, as shown in FIG. 9. The user clicks on 'Forum reply' and the reply dialog appears. After completing the dialog, their new message appears in the Forum.

7. Inviting Additional Participants

Figure 10:
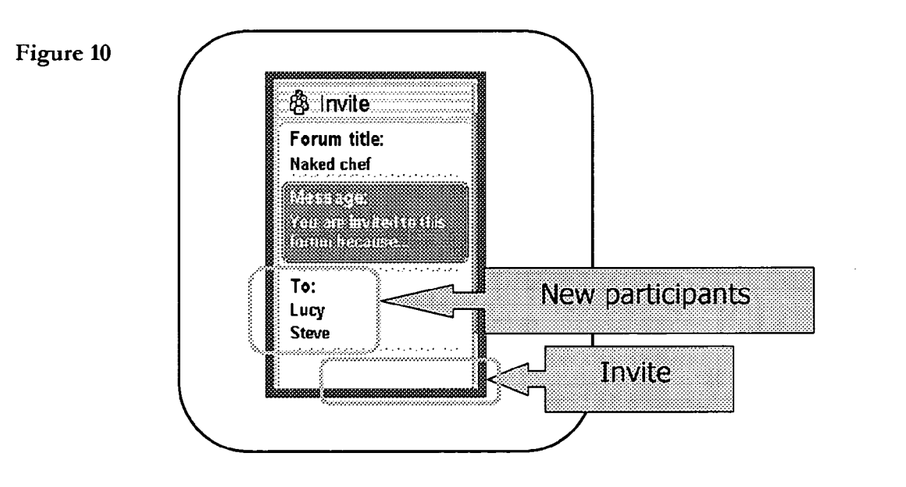
Figure 11:
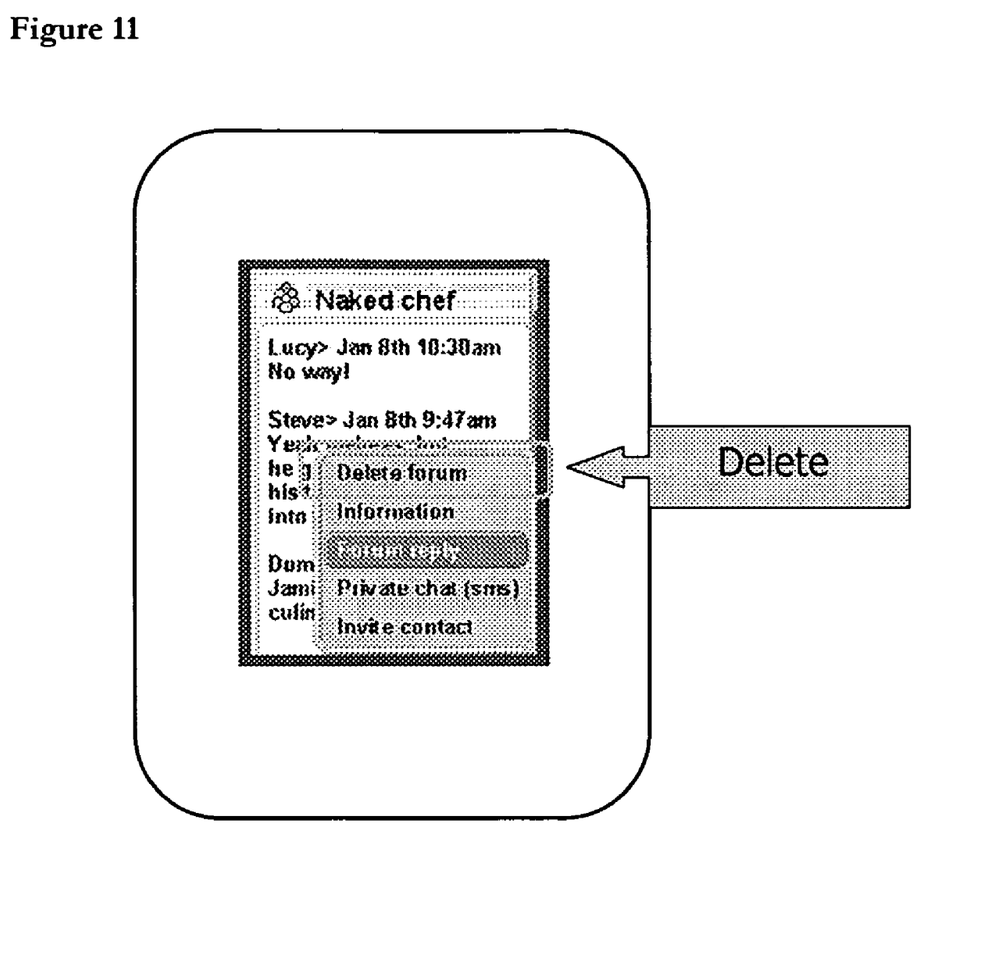

Any Forum participant can invite new contacts (Forum management/membership issues), as shown in FIG. 10. The user clicks on Invite contact and invites new participants in the same way as used for starting a Forum.

8. Deleting Forums (Unsubscribing)

On occasion, users may wish to delete a Forum (stop participating and remove from their device) as shown in FIG. 14. The user selects 'delete' and the Forum no longer appears in the application (they no longer receive any messages to do with that Forum). Users should be able to delete Forums because they no longer wish to participate.

Other Details Relating to Forums are that:

Forums die 'naturally'. If all participants unsubscribe from a Forum then it ceases to exist.

The contents of a Forum can be forwarded-on, for example, to contacts who are not participating in the Forum, or to the Jotter application.

The Forums application will include a Private chat function. This will allow a Forum participant to establish a private conversation (e.g. SMS or voice) with another Forum participant. The remaining participants will be unaware of this conversation.

Other Use Scenarios

The scenario presented above, Scenario 1, is a simply text messaging use of Forums. Other use scenarios are now presented.

Scenario 2: Discussion of Photos

An 'embedded discussion' version of Forums allows the creation of a threaded discussion attached to personal information stored on a remote server. Storing personal information (contact lists, diaries, photographs etc) on a remote server is one possible model of enabling robust storage combined with easy access to personal information.

Posting photographs (perhaps a photo diary) to one's remote store for a dedicated group to view has been widely discussed, but it does not offer any of the two-way communication richness which develops relationships. Forums overcomes this deficiency as follows:

A. A user is on holiday, and he takes a few photographs of the beach with his digital camera.

B. He wants some of his work colleagues to see these, so he uploads them to his remote storage area.

C. He then creates a Forum message based on the photographs and sends it to a group (as discussed above).

D. All group members receive (or are given access to) an object which incorporates or references the photographs. They can make comments on the pictures and the group members can again discuss and deride the content. Again, from the users' perspective this takes place within a single live object, rather than via dozens of messages. Some people post their own photos back.

One interesting consequence of this approach is that it effectively proposes a separation between actual storage of data on the remote server, and the presentation/access of that data (of which there could be many instances, for a given stored piece of information). In turn, this implies a message like the above could be 'killed', instantly revoking access for all the group, without changing their access to other materials or contacting their devices.

Additionally, it raises the possibility of discussions being started by a reader of someone's data on the remote server, provided they have the appropriate access. Much of what currently exists at large on the Web as personal home page content would seem likely to benefit from this kind of two-way flow of information, rather than simple broadcast.

Scenario 3: Social Scheduling

Some further insights and assumptions are also worth stating:

Social scheduling often begins with an open question. Invitations are typically anchored to one or more dominant criteria such as the time, the activity, the location, the people involved or an event. (For example, "Do you want to go to the cinema?", or "Anyone fancy going out on Friday?"). There is then typically more flexibility about the other criteria, in order to ensure attendance and common agreement. So, in short, making arrangements often requires some open discussion, rather than a simple proposal and a yes/no response.

Negotiations typically have several phases. After a group of people agree to go "to the cinema" or "out for dinner", there are still sub-debates, also consensus-driven, about more precise locations, times, choices etc.

Unpredictable information is valuable. Forming opinions on where to go, what to see, what to eat etc. is informed by, and can be greatly enhanced by, people contributing their knowledge and experience to a discussion.

The value of contributions is higher when individuals know the state of the debate. Large email threads with multiple recipients often lead to irrelevant responses.

Any mechanism for social co-ordination should mostly use invitations rather than simply be passive. Hence, social bulletin boards, where people can simply state their intentions (I'm going to the cinema tonight at 9 pm) tend to be ineffective.

From all of the above, it is clear that specific social proposals are not really enough. That is, a smart message saying "Meet me at the Pacific Bar at 9.30 pm on Friday" would work around a lot of the limitations of existing media and mobile device constraints, but A. existing message forms still have a great deal of difficulty dealing with this kind of suggestion once several people start asking for adjustments to the details or counter-proposing;

B. there is value in unpredictable information and discussion; and

C. openness, discussion and exchange of ideas is generally necessary for something which is consensus-driven.

Forums however clearly addresses all of these deficiencies, as will be amplified in the following use scenario.

The first social scheduling scenario (Scenario 1) offered basic advantages over existing technologies. But longer-term, a much deeper level of richness can also be achieved using Forums.

For example, in Scenario 1 the Forum 'template' is essentially a basic default Forum template. But it is possible to have more advanced, tailored templates, as the following Scenario 3 illustrates.

1. A user is thinking about a trip to the cinema, so he creates a new Forum titled "Anyone fancy a trip to the cinema next week some time?" using a Forum template from the Odeon cinema web site.

2. He nominates the group to be invited. His device either contacts the group members directly and individually, or else passes their unique IDs to a central server which handles contacting each group member and handles also storing the message thread relating to this subject.

3. His nominated group is now invited to the Forum using the same kind of mechanism as in Scenario 1.

4. These people come and join the discussion about which night to go on perhaps using some simple control to indicate their preferred days, which is then reflected in a diagram showing the aggregate), which actual cinema to use, and which film to see. The Forum has links to trailers, reviews and schedules etc. for each film (and hence the desirability of integrating this template into a cinema web site since that site will have the film related content), which are all used to inform the discussion.

5. Once agreement has been reached, he uses a link to book the tickets. Each group member is contacted individually to approve their payment for a seat.

6. Following the film, some discussion of the film takes place on the Forum before it dies out. One or two people also use its link to buy the film soundtrack at Amazon.com.

Scenario 4: A Digital Memento from a User's Birthday

In the above scenario, the use of a Forum goes beyond an improved way of making arrangements, and incorporates other media and information to support better-informed discussion and booking, making the pre-event a form of social engagement in itself.

It is also possible to imagine that this could ultimately lead to a Forum having value after the event has passed.

For example:
1. A user wants to meet up with friends and go for a major night of clubbing to celebrate his birthday. He use his device to create a Forum called "Who wants to go clubbing on my birthday (the $29^{th}$)?"
2. He invites all his group 'Friends' to the Forum.
3. Many agree to come along, and the discussion centres on which club to go to.
4. People post MP3s of the kind of music played at each club, and links to the club's pages. These are held at the central server and made available to all to download or receive as streaming media.
5. All group members eventually agree on a place, then go out for the night.
6. Two or three members take pictures during the night using their digital cameras.
7. Everyone posts their photos on the Forum, and someone posts the bar bill etc. More discussion takes place about the photos, with remarks, amusing comments etc.

The Forum activity eventually dies out, but at the end of it all group members have a complete encapsulated record of the night, from its inception to its end, including photos, music and so on: a 'digital memento'.

Other Possibilities

A permanent community. Scenario 4 presents the Forum activity as having value in its own right—it forms a digital memento. This may also apply to Forums which are not linked to a specific event or excursion. For example, supposing following Scenario 4, members of the Forum continued to return to it from time to time and make postings because they knew that this was a way of staying in touch with a whole group of people (perhaps a group defined by the shared experience of that one night). Group objects may define people using persistent identifiers which are maintained despite changes in transient identifiers—e.g. mobile telephone numbers, office telephone numbers etc. Hence, the group object identifier could be a permanent ID, which the remote server uses as the master 'key' for an individual, with individuals posting their less permanent communication links to the server (e.g. their mobile telephone numbers, e-mail etc). The server then ensures that whenever person X needs to be contacted, the correct and up to date contact number and mechanism is used. Hence, even though person X may have changed his mobile telephone number, or specify that only a specific mobile number be called in the evenings or for social events, the server is aware of these facts and routes a message to person X using the appropriate mechanism. Hence, people using Forums need only define an individual to be brought into a Forum and need not worry about how that individual will be contacted. Effectively this is a richer, less noisy and more reliable substitute for a mailing list for a group of friends.

Taste matching. Once a user builds up a large collection of digital mementos, he effectively has a body of information that defines his tastes in music, films etc. which has been built up without overhead. So, once this body of information is in existence, devices could make comparisons and matches between individuals (say, if you add a new person to a 'friends' group), and point these out. This could be an effective way of breaking down social barriers when meeting new people—their WIDs could be accessed and a mutual enquiry performed to determine areas of overlapping interests.

Opinion mart. The 'low-key' nature of Forums, allowing more information to be exchanged and stored centrally without significant message pollution, means that it is a good way of exchanging information with low frequency updates, of a type for which it is not worth grabbing someone's full attention. So a collection of people who have established some common interests therefore could use Forums to exchange music or book recommendations and low-frequency conversations. Reviewing new postings to these kinds of groups could be an excellent way of using waiting time (e.g. waiting at an airport to catch a flight etc.)

Status Check

Users can indicate personal 'status' information on their WIDs—such as pre-selected states ('in a meeting'; 'want to go out' etc.) This kind of 'presence' information can within Forums be shared within selected groups, a further example of the application independence of group objects being critical. As a specific example, Bob used his wireless information device to set up a meeting this morning at 9 a.m. with 5 colleagues. As it gets towards 9 am, Bob checks the Forum he used to schedule the meeting and can see the 'status' of all of the attendees at a glance: he can see that Carol and Diane both have "Running 5 minutes late" set, and that Alice is "Off sick". This saves him calling several people.

Microcoordination

Carol and her friends have agreed to meet at a bar near the cinema at 7 pm, but by 7.15 pm Carol still can't find the bar. She opens the Forum they used when discussing the outing and hits Send on her phone. This initiates a voice call invitation to all Forum members. Two of her friends answer and say that they are wandering around, also unable to find it. Finally Alice answers and explains to all three how to get there.

After the cinema, Carol went home and the rest of the group went out clubbing. Carol wants to know what happened after she left, but doesn't want to wake anyone, so she looks at the status of her friends (i.e. their presence information which defines what kind of activities they are undertaking at that time) and sees that Bob is definitely up: his status is marked as "Playing Golf". She calls Bob, but flags the voice call as being 'Public' within the rest of the group, so that if anyone wakes up they can see that a call is going on and join in ('public' calls are discussed in more detail later on).

Shared Interests

Bob is browsing a cinema service thinking about going abroad for a long weekend. He notices the Tomb Raider movie is showing, but frankly he is concerned that it might be a shallow cash-in. He highlights the Tomb Raider item, and selects a 'Find me groups associated with this' command on his WID. He gets a list of public interest groups dedicated to gaming, cinema and Lara Croft by response. Opening what looks like a serious general cinema group, he posts a quick question, "Is Tomb Raider really any good?", and in a few moments replies start appearing. While he is in the group, he notices that someone mentions they are a fan of Woody Allen—he posts a quick message saying he noticed there is a Woody Allen season on at the National Film Theatre before quitting.

You Might Like This!

Carol notices a new item in her list of groups, and sees that it has attached a note from Zoe, her customer service contact at her network operator company. The note says that she might be interested in this new group where members can get and discuss demos of games in advance of their release. The network operator's customer database had suggested this based on Carol's recent purchase of a 'jetski' game for her WID, and on her membership of another gaming discussion group.

Call Gestures

Bob, Carole, Alice and Eddie are in a Forum based call with three other friends of Eddies (that Bob and Carole do not know). It's not really a focused call—it's just 2 am on Friday night and they are all having a laugh after the pubs shut. While the call is ongoing, members can see visual representations of each other. Each character does a kind of cartoon 'talking' animation while that person is speaking, while the other characters perform animated tricks with 'thumbs up' gestures, or indicating boredom.

Other Media

Permanent membership means supporting users in a variety of contexts. Forums facilitates the situation where, to a degree, the other members of a group are 'always there' for a user. Even something as basic as arranging to meet up often involves a call ("I'm over here, where are you?") as well as initial text-based coordination. So in practical terms this means integration of audio/voice calling, both for 'reading' and 'writing' in Forums. It also means ensuring other interfaces—e.g. via the Web and PCs, and possibly via normal phones—are available.

Collaborative Activity

It is one thing to build up the aspects of Forums which help create a stronger, more permanent group. But beyond this is the fact that groups go and do things. Forums acts as springboard for playing games, going surfing, listening to music etc. Initially this can be as simple as seeing who is there to play a game, and having Forums dedicated to particular games/game areas.

Radio Forums

A group of people can use Forums to collectively select and listen to music. Typically this would be amongst a group of friends, or between two partners. All users submit tracks to a communally-built-up playlist. This would in reality be by creating a link between the user's store of digital music and the playlist stack. Both of these items may be server-based. The tracks are then played in turn and streamed from the server to the devices of everyone within the group. Users may exchange text or voice comments with each other, and comment on tracks. Users may vote on tracks, or apply a simple rating of a track that is in the playlist These ratings may be used to build up 'charts' and to bias a randomised playlist towards the more popular tracks.

One very important application of Forums is in facilitating voice calls between several group members (Group Call). The following sections address this.

Forums Group Call

It is anticipated that users will be members of several Forums. At one level, these Forums consist of ongoing text discussion between friends. But additionally, the group could be used to start an easy group call (or 'conference calls') involving all members of the Forum. To start a Forum call, the user would press the device 'Send' key while either viewing the Forum or when the Forum is selected in a list of all Forums. This would send a message to the network telling it to:

A. Set up a conference call involving all members of the Forum.
B. Alert the devices of all members of the Forum.

The creation of the group call is not necessarily via a single message to the network; it can be by the device itself executing a number of calls and splicing them using standard network commands. All Forum members will in any event then be notified that a Forum call is taking place and that they are invited. They can choose to join or leave the call then, or at any later time while the call is active.

Public Calls/Public Call Notification

Because of the limitations of current telephone systems (i.e. point-to-point, or at a push allowing conference calls after a complicated setup), when friends call each other, they typically do it on a one-to-one basis. However, most individuals are members of more complex social networks, and may not necessarily want to exclude all others from their communications. With Forums, calls can be marked as 'public' within the context of a predefined group of people (in a Forum).

This functions as follows:

A. A user is viewing a Forum, and makes a voice call to a friend who is also a member of that Forum.
B. The user is given the option of making the call public within that Forum, or leaving it private.
C. If the user elects to do this, the one-to-one call takes place as normal, but the fact that it is going on is visible to other members of the Forum.
D. Other members of the Forum may join in the call if permitted by the callers.

This allows a flexible form of communication which is a more natural reflection of real-life interaction within social networks.

'Make Available to Forum'

This is a variant on the above, where an individual involved in a call can select an option to 'share' that call with the members of a specified Forum. This would be useful for, e.g., when a grandparent calls one member of a family, and that person has a Forum set up for the whole family.

Group Call Whisper Mode

This applies to calls taking place within Forums. While a Forum group call is ongoing, participants may want to send messages or remarks privately to other members of the call. This allows the user to:

A. Use the device keypad or other controls to select a subset (one or more of the members of the call) and to initiate a mode whereby only those people are being communicated with;
B. Communicate in private with those other individuals; and
C. Leave this mode and return to normal operation.

Call Gestures

During calls, particularly conference calls, it would often be useful to make non-verbal signals. Users can use the device keypad or other (e.g. on-screen) controls to send pre-defined 'gestures' to the other devices involved in the call. These gestures are displayed or otherwise rendered (e.g. aurally) on the other devices. The gestures may be sent to the whole call group or to a subset. Typically, gestures may be items that indicate agreement, disagreement, that the user has something to say and wishes to speak next, or the user's mood or emotional response to something being said.

Other Scenarios

Sending Messages to Forums

It is possible that Forums are given email addresses and telephone numbers in their own right, so that users may send text or voice messages to a Forum from any communications device.

Voice Playback of Forum Messages

It should be possible for the entire contents of a Forum to be played back via a headset. This would involve text-to-speech modules.

Social Browsing

This is an augmentation of Forums/groups so that users can automatically exchange their web navigation paths and comments with others. Within a group/Forum, it is possible to see the internet sites other people have browsed to. These may be on a per-person basis, or aggregated to ensure anonymity.

In either case, the users' devices simple send a notification to the Forum of each site visited (when notification is allowed by the user—it may be turned off). The Forum itself may then display the list of visited sites in order of popularity or novelty etc. to all members. In addition, users may attach comments with each of the notifications, so that other Forum members, when browsing sites, can read the comments from their peers associated with those sites, which appear to be left there (like 'virtual graffiti'.

Call With

When the caller's device is within Bluetooth™ range of another device which is in the user's telephone book, the user can elect to 'call with' that person when placing a call. In this case, the other person is automatically part of the call. This would be popular for young users, e.g. in pubs, as well as useful in work contexts.

Location-Based Status

This combines user specified zones with changeable devices attributes (such as availability, profile etc.) so that the device automatically changes state when inside or outside those zones.

This functions as follows:

The user specifies an area (e.g. by drawing on a map) to be associated with a particular device state. E.g., the user may draw a large rectangle around a certain part of the city where his/her office is, the idea being that the device can assume the user is 'at work' when in this zone. Selecting the zone in a fairly rough and low-granularity way means that location information obtained by the device doesn't need to be particularly accurate.

The user specifies the device attributes to be associated with that zone. E.g., for a device 'Status' quality to read "At work", "At home", "In town". The device periodically obtains location information from the network (e.g. from a location information server), or via some onboard method such as GPS or some other similar means. The device cross-references that location information with the user-specified 'zones' to see if one pertains. The device switches the current attributes to be in line with those specified for the current zone.

Evolution of Forums

Figure 12:
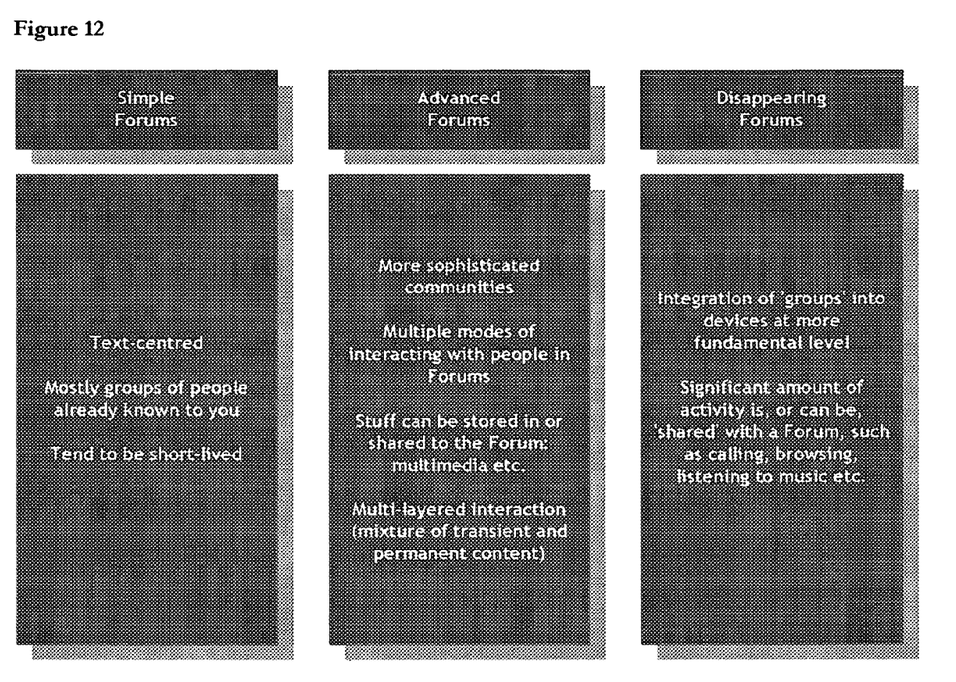
FIG. 12 is a table showing typical features of three generations of Forums applications.
Figure 13:
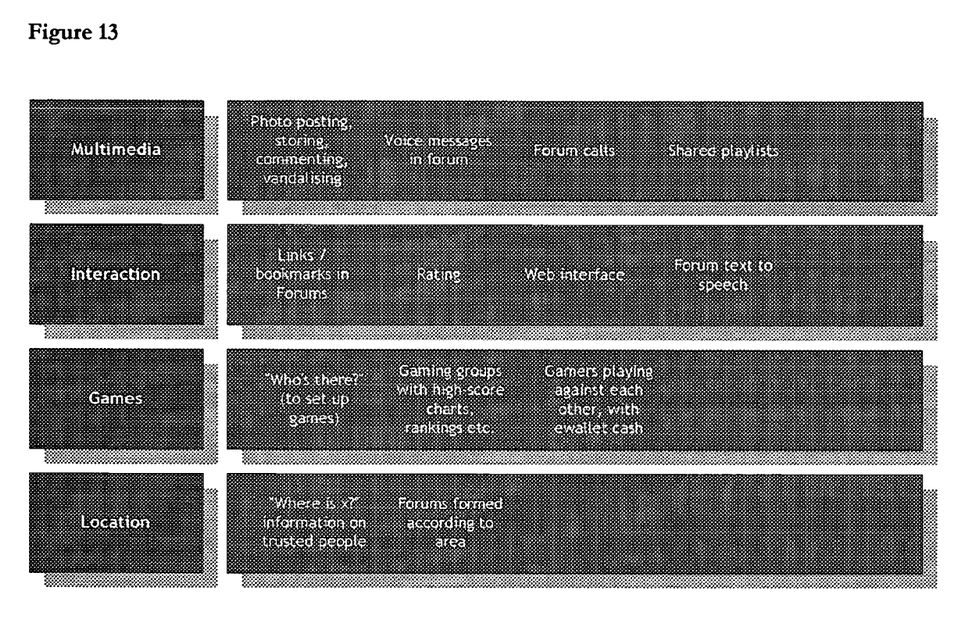
FIG. 13 is a table showing typical group based applications which are enabled using Forums.

FIG. 12 gives an outline of the functionality to be developed in Forums. FIG. 13 summarises some of the kinds of group based activities made possible in Forums.

APPENDIX 1

Requirements and Issues for Forums Groups

Creation of Private Groups

Private groups would typically be used amongst individuals who already know each other in some way. They may be used for example to discuss and arrange an outing to the cinema. (The simplest form of group activity is here assumed to be an SMS-like group discussion.) Typically they will be informal, amongst trusted individuals, and in many cases replacing a multitude of one-to-one communications.

These factors raise the following requirements:

A. The user must be able to create private groups easily;
B. It must not be significantly harder for the user to initiate communications with a private group than it is for the user to initiate one-to-one communications.

The following proposed approach arises from these requirements:

The user must be able to create a private group simply by initiating a group activity (such as a message-based discussion) and associating that activity with one or more other users. (The user is implicitly a member of any groups he creates.) This means that there is no additional overhead to setting up a group than simply adding names to an address list.

So, in the example of a discussion regarding a trip to the cinema, the work required of the user to set up a group is simply the creation of a message (e.g. "Anyone want to see Tomb Raider on Friday?") and the selection of recipients for that message.

Permissions in Private Groups

Commonly, implementations of groups utilise concepts of 'ownership' and differentiated sets of rights within the group. This may carry setup and/or maintenance overheads for the users of the group, which is not in keeping with the top-level requirements set out above. Therefore, the following are deemed to be requirements:

A. There are no permission settings to be configured for private groups.
B. All members of a private group have identical and equal permissions regarding that group.

Since this approach removes one of the tools groups use for controlling malicious behaviour (i.e. permissions), the ability to behave maliciously itself ought to be controlled. Therefore:

A. No member of a private group has permission to 'kick' (evict) another member.
B. However, since meta-communication and exclusive sub-discussions will naturally occur in any grouping, each member of a private group must be free to edit a group object to create a new group.

Persistence of Group Activities

A group activity (for example a group discussion) is normally the most visible manifestation of a group. Since users may want to leave group activities, the following is a user requirement:

A. The user must be able to remove any evidence of a group activity from his device (and personal information space).

In practice, it is suggested that this is via a 'delete' metaphor. When all participants in a group activity (e.g. a discussion) have 'deleted' that group activity, the group activity itself is removed from the server.

Reuse of Groups

Since it is essential (in order to ensure maximum user uptake of group-related functionality) that the barriers to group activities are low, there is a user requirement:

A. Group 'objects' representing private groups are available separately from group activities. Deleting a group activity (the content associated with a group) need not necessarily delete the group object associated with that activity.

This means that members of a private group can re-use that group object to either initiate another group activity, or, potentially, to form the basis of another new private group. In addition, it follows from the existence of group objects that:

A. Users must be able to examine the properties of group objects. These may include member lists, nicknames and presence information regarding the members.

Finally, there is the requirement:

A. Group objects representing private groups can themselves be 'deleted' by each user.

In order to prevent an excessive proliferation of group objects, it may be that group objects dormant for a certain period are deleted.

The privacy requirements regarding public groups are different, therefore:

A. Group objects representing public groups are not available to users separately from the associated group activities, nor do they exist following the deletion of the group activity.

Selection of Group Members for a Private Group Activity

It follows from the above sections, that in selecting the individuals to be associated with a group activity, the user can:

A. Select individuals from an address book or buddy list,
B. Select a category of individuals from an address book or buddy list,
C. Reuse a private group from a previous group activity,
D. Or any combination of the above.

'Selection of individuals' for public group activities is not itself possible. In the public case, the user browses and enrolls in public groups according to certain criteria. This prevents unwanted communication between individuals unfamiliar with each other.

Naming of Group Members

The following are user requirements regarding the naming of group members:

A. Each member must be identifiable in a group by a nickname (as opposed to simply being identified by, say, their phone number). This type of name is typically short, informal and most commonly a single word.
B. All members must see the same nickname for any given individual within the context of a group. (As opposed to resolving telephone numbers to the name for that number in each user's address book: this would both introduce potential for ambiguities and mean that newly invited members would not necessarily have numbers that could be resolved by all group members.)
C. Members must be able to have different names in different groups.

Given these requirements, the following two solutions are suggested. The choice between them can be made according to the infrastructure available.

i) Each member gives himself a nickname when joining each group. (A history list of nicknames with a default suggestion could be available on the client to make this easier.) This nickname is the name seen by all the group members when that individual acts or contributes to the group activity. In a private group, the nickname can also be resolved by all members to the user's phone number (or similar unambiguous ID), so that the individual's true identity may be known. This ensures that all the nicknames seen in the group seen can be seen to correspond to the individuals invited to be members of the group. Individuals may change their nickname within the group, and these changes will be announced.

ii) Each user has one nickname per persona. This is stored centrally and available to all of the groups that individual is a member of. Thus, the user's persona is known by the same nickname in each group. The user may change this nickname—an action that will be announced to each group. (This second solution may offer the option of over-riding the user's name for any given group.)

The first solution is convenient for a situation where the standardised storage and lookup of centrally-stored personal data is not fully established.

The second solution, when taken with the option of over-riding the global name if necessary, is superior from a usability perspective: it makes continuity between the name of the persona invited to a private group and the name of that persona appearing in the group most likely. This second solution should be adopted if the appropriate storage and lookup infrastructure is available.

Naming of Group Members: Authentication

In order to prevent malicious misuse of identities, one of the user's personae may be 'signed': that is, it is guaranteed to be the persona belonging to a named individual Inviting Members to a Private Group The following are user requirements regarding inviting other personae to a private group:

A. It must be possible for all members of a private group to invite new personae.
B. All members of a private group must be aware of the joining of a new persona.
C. All members of a private group must be aware of the internet of any new persona.
D. Any member inviting another individual to a group must be able to send a cover-note message along with the invitation to the group. Typically, this would be used to explain the nature of the group or the reason behind the invitation.
E. Any individual being invited to a group must be able to respond (i.e. accept or reject the invitation) immediately or to delay the decision and respond later. This is to allow individuals to enquire further about the group if necessary.

Awareness of Group Members

The fact that group populations can change raises other requirements:

A. Users must be able to see all the personae that are members of a given group.

Secondly, because group activities in themselves are 'social spaces', it makes sense that:

B. Users can see the 'status' and other published presence information of other group personae.

This will enable groups to be springboards for live collaborative activity such as gaming.

Awareness of Group Activity

The key user requirements regarding awareness of group activity are:

A. Users must be able to know easily when a group activity has had new content added.
B. Users must be able to see from a list of groups which ones have new content, along with, potentially, an indication of the quantity and type of new content in each.

Both the number of groups the user belongs to and the amount of activity associated with those groups may be very large. The notification of additional content must not be intrusive.

Adding and Removing Content in a Group Activity

The following are user requirements regarding adding any content (e.g. a message or an image) to a group activity:

A. All members of a group can add content to a group activity freely.

In the cases of some content types (e.g. bookmarks, images), deletions of content may be possible. In this case:

B. Members of a group may delete the content they have contributed to any group activity.

Natural exceptions to this 'deletability' would include messages in a discussion, since their removal would cause the discussion to lose its meaning.

Public Groups

Public groups are collections of people with interests in common, who do not necessarily know each other prior to their membership of a group. They may be open or closed.

A. Open public groups are groups that anyone can join.

B. Closed public groups are groups where memberships is controlled and users typically request permission to join from a group moderator.

Finding Public Groups

Public groups are collections of people with interests in common, who do not necessarily know each other prior to their membership of a group.

It is desirable that there are public groups in the first instance so that the user may engage in group activity prior to his peer-group all owning group-enabled devices. It follows:

A. Users must be able to find public groups easily.

B. Typically users would find public groups by categorised lists and a search facility. Examples of categories of public groups include: leisure interests, location, game-related, and so on.

Joining Public Groups

Users join public groups as follows:

A. Open public groups may be joined by entering the group after the group has been found on a list of groups on a server.

B. Closed public groups may be joined by requesting membership after the group has been found on a list of groups on a server. Attempting to enter the group will prompt the user to request membership.

The user may choose to add a shortcut to a new group to his/her Groups application.

Creation of Public Groups

Public groups may be created by service operators and/or users at the operator's discretion.

Privacy in Public Groups

The user requirements regarding privacy in public groups are:

A. A member of a public group must be able to know only the nickname (and any wholly public presence information) associated with another persona that is a member of that group without further consent on the part of that member.

Permissions in Public Groups

Wholly public groups cannot count on the degree of trust that exists in private groups. Therefore, a system of permissions is required. The following levels of permission are suggested:

A. Public group Master Moderator. This is the highest degree of authority within the public group. The Master Moderator can:
evict personae from the group
bar personae from the group
accept personae to the group
delete the group
change the group from open to closed and vice versa
delete or modify any of the group content
create and uncreate group Moderators The Master Moderator may be the service operator or may be an end-user. There may be more than one Master Moderator.

B. Public group Moderator. Moderators can:
evict personae from the group
bar personae from the group
accept personae to the group
delete or modify any of the group content C. Public group Member. This level of access gives individuals the right to read and contribute to the group. He may have the right to delete or modify all or some of the content he has posted to the group activity.

D. Public group guest. This level of access may give individuals access to some of the content of the group activity, but they cannot post content.

Invitation to Public Groups

Members of public groups should be able to invite other personae to public groups.

While the invention has been described with reference to the preferred embodiment thereof, it will be appreciated by those of ordinary skill in the art that modifications can be made to the structure and elements of the invention without departing from the spirit and scope of the invention as a whole.

The invention claimed is:

1. A group communication method for a wireless information device that enables communications to be sent and received between several wireless information devices operated by end-users that form a group of end-users, the group being a sub-set of the end-users for whom the device stores contact information; in which the method comprises the steps of:

(a) the end-user of the device defining the identities of end-users that form the group;

(b) a group object being constructed that defines or references members of the group in a way that enables communication to take place from the device and all other members of the group;

(c) the group object being used by a first application running on the device to enable communication from the device to be made automatically to all members of the group;

(d) the group object being used by a second application running on the device, unrelated to the first application, to enable communication from the device to be made automatically to all members of the group.

2. The group communication method of claim 1 in which the group object is used to initiate one or more of the following:

(a) group based e-mail
(b) group based text messaging
(c) group based telephone calls
(d) group based multi-player gaming
(e) group based multi-media messaging
(f) group based accessing of documents, music files or web sites.

3. The group communication method of claim 1 in which the same group object is capable of being used by any of the following applications irrespective of it being used by any other application:

(a) e-mailing application
(b) text based messaging application
(c) voice telephony
(d) multi-media messaging
(e) productivity applications (including word processing, spreadsheets, and presentation applications)
(f) gaming applications
(g) music playback
(h) video playback
(i) diary application
(j) address book application.

4. The method of claim 1 in which communication can be over any bearer or protocol supported by the device.

5. The method of claim 1 in which communication is a voice conference across potentially all members of a group, and is initiated by one person sending a message from his device telling the network to set up a conference call involving all members of the group by notifying each group member appropriately.

6. The method of claim 1 in which communication between two members of a group can be marked as public by either member and hence made accessible to any other members of the group.

7. The method of claim 1 in which the group object comprises a unique ID or IDs which define the identity of members of the group and can be used by the device and/or a server to establish communication with each member of the group.

8. The method of claim 1 in which the or each ID is a pointer to resources maintained on a remote server.

9. The method of claim 8 in which the or each ID is a persistent identifier and is independent of conventional communications identifiers and instead references up to date versions of those conventional communications identifiers.

10. The method of claim 1 in which members of a group defined by a group object share a common physical or logical location.

11. The method of claim 10 in which a location specific group object is auto-generated.

12. The method of claim 1 in which the group object is gaming related.

13. The method of claim 12 in which the gaming related group object is auto-generated according to predefined criteria.

14. The method of claim 1 in which the group object is interest specific.

15. The method of claim 1 in which the group object is used to share personal content amongst a pre-defined group.

16. The method of claim 15 in which personal content comprises photographs, opinions, music playlists, and/or music tracks.

17. The method of claim 16 in which personal content includes music tracks which are then streamed to all members of the group.

18. The method of claim 1 in all communications in a group on a given subject are treated as single object.

19. A wireless information device programmed with computer software which enables communications to be sent and received between several wireless information devices operated by end-users that form a group of end-users, the group being a sub-set of the end-users for whom the device stores contact information; in which the device (a) receives from the end-user of the device the identities of the group of end-users;

(b) constructs a group object that defines or references members of the group in a way that enables communication to take place from the device and all other members of the group;

(c) uses the group object with a first application running on the device to enable communication from the device to be made automatically to all members of the group;

(d) uses the group object with a second application running on the device, unrelated to the first application, to enable communication from the device to be made automatically to all members of the group.

* * * * *